United States Patent
Li et al.

(10) Patent No.: US 10,968,377 B2
(45) Date of Patent: Apr. 6, 2021

(54) CHEMICAL-MECHANICAL PROCESSING SLURRY AND METHODS FOR PROCESSING A NICKEL SUBSTRATE SURFACE

(71) Applicant: Cabot Microelectronics Corporation, Aurora, IL (US)

(72) Inventors: Tong Li, Singapore (SG); Hon Wu Lau, Singapore (SG)

(73) Assignee: CMC Materials, Inc., Aurora, IL (US)

( * ) Notice: Subject to any disclaimer, the term of this patent is extended or adjusted under 35 U.S.C. 154(b) by 369 days.

(21) Appl. No.: 15/951,598

(22) Filed: Apr. 12, 2018

(65) Prior Publication Data
US 2018/0298257 A1 Oct. 18, 2018

Related U.S. Application Data

(60) Provisional application No. 62/485,444, filed on Apr. 14, 2017.

(51) Int. Cl.
| | | |
|---|---|---|
| *C09K 3/14* | (2006.01) | |
| *C09G 1/02* | (2006.01) | |
| *C09G 1/04* | (2006.01) | |
| *B24B 37/04* | (2012.01) | |

(52) U.S. Cl.
CPC .......... *C09K 3/1472* (2013.01); *B24B 37/044* (2013.01); *C09G 1/02* (2013.01); *C09G 1/04* (2013.01); *C09K 3/1463* (2013.01)

(58) Field of Classification Search
CPC ...... C09K 3/1472; C09K 3/1663; C09G 1/02; C09G 1/04; B24B 37/044
See application file for complete search history.

(56) References Cited

U.S. PATENT DOCUMENTS

| | | | | |
|---|---|---|---|---|
| 6,007,592 A | * | 12/1999 | Kasai | C09K 3/1463 106/3 |
| 6,152,976 A | * | 11/2000 | Ishitobi | C09K 3/1463 106/3 |
| 6,334,880 B1 | | 1/2002 | Negrych et al. | |
| 6,755,721 B2 | * | 6/2004 | Ward | B24B 37/044 451/28 |
| 6,957,511 B1 | | 10/2005 | Leigh et al. | |
| 8,226,841 B2 | * | 7/2012 | Palanisamy Chinnathambi | C09G 1/02 216/89 |
| 9,039,914 B2 | * | 5/2015 | Palanisamy Chinnathambi | C09K 3/1463 216/89 |
| 9,534,147 B2 | * | 1/2017 | Lau | B24B 37/044 |
| 2003/0171072 A1 | | 9/2003 | Ward et al. | |
| 2007/0010098 A1 | * | 1/2007 | Brusic | B24B 13/015 438/692 |
| 2008/0200098 A1 | * | 8/2008 | Moeggenborg | C23F 3/02 451/37 |
| 2011/0275168 A1 | | 11/2011 | Davis et al. | |
| 2013/0183889 A1 | * | 7/2013 | Yoneda | B24B 37/044 451/59 |
| 2015/0152289 A1 | | 6/2015 | Zhang et al. | |
| 2016/0288290 A1 | * | 10/2016 | Li | B24B 37/048 |

* cited by examiner

*Primary Examiner* — Dung Van Nguyen
(74) *Attorney, Agent, or Firm* — Thomas Omholt; Erika R. Singleton

(57) ABSTRACT

Described are chemical mechanical processing (CMP) compositions and related methods, including compositions and methods for polishing nickel phosphorus (NiP) surfaces for hard disk applications.

8 Claims, 2 Drawing Sheets

Single-Platen Polish Process versus Conventional 1P+2P (Two-Platen) Polish Process Single-Platen Polish Process versus Conventional 1P+2P (Two-Platen) Polish Process

Figure 1

Examples of SEM images of abrasive particles with spherical and irregular morphology

Figure 2

CHEMICAL-MECHANICAL PROCESSING SLURRY AND METHODS FOR PROCESSING A NICKEL SUBSTRATE SURFACE

FIELD OF THE INVENTION

The invention relates to chemical mechanical processing (CMP) compositions and methods, including compositions and methods for polishing nickel phosphorus (NiP) surfaces for hard disk applications.

BACKGROUND

The electronics and microelectronics industries rely on chemical mechanical processing techniques for preparing sophisticated electronic devices that pervade our modern world. These include microprocessors and other integrated circuits that rely on semiconductor materials; solid state and hard disk memory devices; optical materials and devices; and various other commercial and consumer electronic items.

One ubiquitous example is the hard magnetic disk, used for storing digital information in a manner that allows for highly efficient random access of the information. Hard disks now available for memory applications include multiple layers of different materials coated onto a rigid disk base. Each layer can have a different specialized function depending on specific mechanical or magnetic properties of the material of the layer. One of the layers functions as a magnetic storage layer. But the other layers are also critical to reliable performance of the hard disk product, meaning that precision placement of each and every layer is essential in preparing the disk.

One layer that is common in a hard memory disk is a non-magnetic nickel layer, e.g., NiP, especially electroless NiP, which is present to provide hardness. The processed nickel layer is strong, hard, and can be prepared into a highly smooth and uniform surface that allows the non-magnetic nickel layer to serve as a base for added magnetic and other layers. See, e.g., U.S. Pat. No. 6,977,030. The nickel layer can be provided by electroless plating and may be referred to as "electroless" NiP. See, e.g., U.S. Pat. No. 6,410,104.

The nickel layer as it is initially applied to a substrate will have surface properties (roughness, micro-waviness, flatness) that are not immediately suitable for further processing into a hard disk, such as by applying additional constituent layers of the multi-layer hard disk. Current manufacturing techniques include processing the surface of an applied nickel layer by chemical-mechanical processing to improve the surface properties, especially smoothness (i.e., reduced roughness and micro-waviness), before depositing additional layers of a hard disk product.

In processing a nickel surface to improve smoothness or another surface property, various CMP techniques and slurry materials (e.g., abrasive particles, chemicals, etc.) have been used. Important factors in processing the nickel layer surface include a relatively high removal rate of material from the surface (to maintain processing throughput and an adequate cost of operation), and highly uniform resultant surface properties with a low level of scratching.

Balancing factors of removal rate and highly refined surface properties leads to different processing options, such as using relatively hard abrasive particles to provide higher removal rates, but which can produce excessive scratching, versus using softer particles that provide less scratching but have a lower removal rate. Conventionally, multiple CMP processing steps are used to prepare a nickel surface, including a first step at a first processing apparatus (e.g., platen) that uses hard abrasive particles to effect a high removal rate, followed by at least one subsequent step at a second processing apparatus (e.g., platen) using softer particles that have a lower removal rate but provide a more gentle (fine) process and a final, low roughness, low scratch surface. The first step, for processing the nickel surface following placement of the nickel material onto a substrate surface (sometimes referred to as a bulk removal step) may include the use of one or more of: hard abrasive particles (e.g., alumina particles), relatively large abrasive particle size, a relatively hard CMP pad, and relatively high pressure between the pad and the nickel layer surface during processing. In a subsequent (fine) step designed to provide a finished (low roughness) surface at a relatively lower removal rate, generally smaller sized and softer (e.g., silica) particles may be used along with lower pad pressure and a relatively softer CMP pad. Because the materials (e.g., abrasive particles) of the first and second slurries are different, the first and second steps are conventionally performed at different locations.

Many slurries used for processing a nickel phosphorus surface contain alumina or a mixture of alumina and colloidal silica as abrasive particles. Alumina is often used for achieving a relatively high removal rate in a bulk removal step. But alumina abrasive particles have certain distinct disadvantages. Alumina particles can become embedded in a surface of a nickel layer during processing, forming an embedded (alumina) particle defect. The alumina abrasive particle can remain embedded in the nickel layer throughout subsequent processing, eventually forming a surface protrusion in a finished hard magnetic disk surface. During use of the hard magnetic disk product, the surface protrusion can cause a head crash if a magnetoelectric read or write head contacts the protrusion as the head flies over the magnetic disk surface. Consequently, it is desired to find methods and materials (e.g., slurries) that are useful for processing a nickel layer without the need for alumina particles.

Also, as noted, conventional methods of processing a nickel-phosphorus substrate surface require two steps involving different abrasive slurries: a first "bulk removal" step, and then a second "polishing" step. The first step is performed at a first location, e.g., a "platen" that includes a rotating pad, a "carrier" to hold the substrate in contact with the rotating pad, and a dispenser for dispensing fluid such as a slurry that contains abrasive particles in a liquid carrier. During the first step, the carrier holds the substrate in contact with the pad, and slurry is dispensed to the pad, the substrate, or both. At the end of the first step, a cleaning step is usually performed, to clean the substrate. To perform the cleaning step, the substrates is removed from its carrier and handled external to the CMP apparatus, including by processing in a separate cleaning apparatus. After cleaning, the substrate is then moved and installed in a second carrier of a second CMP apparatus, or a "platen." At the second platen, the substrate is processed by the second (polishing) step, which is a more gentle removal step relative to the bulk removal step, meaning that the polishing step will remove a smaller amount of material from the substrate surface, producing a highly-refined final substrate finish.

A longstanding goal and desire for CMP processing is referred to as a "single-platen" process for processing a nickel-phosphorus substrate, as an alternative to conventional two-platen, or multi-platen processes. A single-platen process would avoid a cleaning step between a bulk removal step and polishing step, and would avoid the need to remove the substrate from a carrier, then re-install the substrate in a carrier, between the bulk removal step and the polishing step. Specifically, a series of CMP steps that can be performed on a nickel-phosphorus substrate surface without removing the substrate from its carrier would be highly desirable, if the series of steps can provide desired surface properties of the finished substrate surface. A method of performing a bulk removal step in a carrier, and a polishing step in the same carrier, would eliminate the need for removing the substrate from the carrier and handling and transporting the substrate outside of the carrier. Eliminating a cleaning step has the general advantage of eliminating a complex and expensive step, and allowing faster throughput. More specific advantages include: eliminating handling and transport of the substrate, which can reduce the risk of contamination or damage that may occur during these steps; and reduced cost of ownership and labor intensity of a CMP process.

SUMMARY

The following describes new and inventive methods and related slurries that can be used for processing a CMP substrate, especially a nickel (e.g., electroless nickel phosphorus) surface of a substrate. The slurries can be referred to as "slurry compositions," "CMP slurries," "abrasive slurries," or simply as a "slurry" or "composition," or the like. A "CMP process" includes steps of bulk removal of material, planarization, polishing, or other steps of processing a surface by chemical mechanical processing.

Methods as described are for chemical-mechanical processing a surface of a nickel layer by contacting the substrate surface with slurry and a pad, with pressure and motion between the pad and the substrate surface, to chemically and mechanically remove material from the nickel layer surface. The described inventive methods and related slurries can be useful for treating a nickel surface at any stage of preparation, including treating a surface as deposited onto a substrate in a bulk removal step, or in any one or more of a series of two or more CMP steps such as a bulk removal step followed by a polishing step that may be performed on a nickel layer.

According to the invention, Applicant has discovered that certain types of abrasive particles are effective for use in a bulk removal step, as primary abrasive particles and optionally as secondary abrasive particles, to provide effective or advantageous removal of nickel material from the substrate surface. Desirably, particles used in a slurry in a bulk removal step (a "bulk slurry") can include primarily silica particles, e.g., may be entirely silica particles, and can otherwise optionally and preferably exclude particles having a higher hardness such as alumina particles. Advantageously, these particles useful as primary or primary and secondary abrasive particles in a bulk slurry, may also be useful as primary or primary and secondary particles of a slurry of a polishing step for polishing the substrate, optionally and preferably allowing for a polishing step to be performed after a bulk removal step by use of a single platen for both the bulk removal step and the polishing step, or, alternately or additionally, for the polishing step to be performed in a carrier that was also used in the bulk removal step, and optionally and preferably without requiring a step of washing the substrate (e.g., to remove abrasive particles) between the bulk removal step and the polishing step. Optionally, the abrasive particles of the polishing slurry may be the same as the abrasive particles of the bulk slurry in amounts, relative amounts, and types (morphology, size, composition), or, optionally, the same or similar slurries may be used for both the polishing step and the bulk removal step.

The Applicant has discovered that collections of relatively small-size (based on average particle size) abrasive particles that have a suitably low average particle size, and suitable morphology and composition, can be useful in a bulk processing step for removing material from a nickel surface. The particles (present as primary abrasive particles or as both primary abrasive particles and secondary abrasive particles) in the slurry can be silica, e.g., colloidal silica, and the slurry can optionally include not more than an insubstantial amount of non-silica particles such as alumina particles, and can preferably exclude non-silica particles, alumina particles, or both. According to the invention, particles that have a suitably low average particle size and a suitable morphology (e.g., shape) and composition can be highly effective in providing a desired removal rate of material during a bulk removal step, even if the particles are not as hard or as large as other particles often used in a bulk removal step, such as alumina particles. In terms of example sizes, useful particles can have an average particle size of not greater than 100 nanometers, e.g., less than 90, 80, 70, or 60 nanometers, depending on shape. The particles may be spherical or irregular in shape, and silica particles (e.g., colloidal silica particles) can be preferred.

The invention relates at least in part to the finding that silica particles having a relatively small average particle size, and that have any of a range of morphologies (e.g., shapes), are useful as primary abrasive particles (or as primary and secondary abrasive particles) in a bulk removal step, for processing a nickel substrate, i.e., that particles with smaller size and relatively lower hardness (e.g., compared to alumina particles) can still be made to be useful and effective in providing a desired removal rate of nickel. Moreover, preferred such particles can be useful in a first (e.g., bulk removal) step of a process, and may advantageously also be useful in a subsequent (polishing) step, which can allow, optionally for a the same or similar abrasive particles to be used in both a bulk removal step and a polishing step; optionally and preferably, a CMP process for treating a nickel substrate surface may require only a single platen to perform both a bulk removal step and a polishing step; alternately or additionally, the method can perform the bulk removal step and the polishing step without removing the substrate from the carrier used in the bulk removal step (both steps may be performed using the same carrier); alternately or additionally the bulk removal step may be performed without a cleaning step being required between the bulk removal step and the polishing step.

Thus, in carrying out the invention, method steps involve one or more slurries that contain silica abrasive particles over a range of relatively small sizes, e.g., an average particle size of below 100 nanometers; the particles may be spherical or irregular in shape; the relatively small size, the composition, and the shapes of the particles allow for similar particles (e.g., particles having average particle sizes below 100 nanometers) to be useful in both a bulk removal step and a polishing step, allowing for advantageous efficiencies of a single-platen process, elimination of a cleaning step, use of one carrier for use during both steps, or two or more of these advantages. Desirably, the slurries can be useful in CMP processing methods that exhibit process features (e.g., removal rate) and finished substrate surface properties (e.g., roughness, microwaviness, flatness, etc.) that are suitable for commercial use, with particularly preferred slurries and methods providing process and finished substrate features that comparable or competitive in performance to conventional two-platen processes.

Conventional two-platen processing is accomplished in two operations: a first involving aggressive material removal (bulk step) and the second involving a fine polish process (fine step) to pursue desired surface properties. The two operations are on two CMP polishers (two platens) with different polishing pads, typically using two different abrasive slurries, and thus require a number of handling, transport, and cleaning steps. In this context, to replace conventional two-platen polishing methods to a commercially useful single-platen process (on a single piece of equipment with same pad) will be a dramatic accomplishment in the field of microelectronic device processing. This development will significantly improve industrial capacity, will reduce total cost of ownership and operation of these manufacturing processes, and will reduce labor intensity. The present invention achieves this result by identifying applicable species (size and morphology) of abrasive particles that are useful in a bulk processing step, and that are also useful in a polishing step, thus allowing for a single-platen process in preferred embodiments of the inventive methods. Example particles are particles having an average particle size of not greater than 100 nanometers. A single more specific example is spherical abrasive particles with average particle size of less than or equal to 90 nanometers (nm); a second example is irregular abrasive particles with average particle size of equal to or less than 60 nm.

As used herein, when referring to "particles" or a particle type that is present in the slurry, e.g., a "primary particle" or a "secondary particle," the present description refers to particles that are identifiable as a collection of a very large number of particles that are considered or used as a single ingredient or raw material for combining with other materials to prepare the slurry. The "particles" have one or more physical features that are measurable or detectable as features of the individual particles of the collection, including certain common features shared by substantially all of the individual particles in the collection, e.g., particle composition (e.g., silica), average particles size of the collection, method of preparation (e.g., colloidal silica), shape of the particles, among others. Certain types of features such as shape or composition are present in all or substantially all (e.g., at least 99.9 or 99.95 percent, based on total particles) of the individual particles of the collection. Other features, as will be understood to the skilled artisan, are measured as an average or mean of a representative sample of the particles of the collection, such as average or mean particle size. The term "particles" can be specifically used to refer to collections of such individual particles that are part of a single ingredient, raw material, or particle type, or a mixture of ingredients, raw materials, or particle types, that may be available or identifiable as a commercially available or specially prepared collection of particles adapted to be included as a collection, as an ingredient of a CMP slurry. When made available commercially, the features of "particles" such as particles size (average, mean, etc.), particle composition, and shape, etc., are usually determined and reported for the collection of individual particles.

In one aspect, the invention relates to a method of chemical-mechanical processing a nickel-phosphorus surface by a bulk removal step. The method includes: providing a substrate having a nickel-phosphorus surface; providing bulk slurry comprising bulk slurry abrasive particles dispersed in liquid carrier, the bulk slurry abrasive particles comprising, as bulk slurry primary abrasive particles, silica abrasive particles having an average particle size of not greater than 100 nanometers; providing a polishing pad in contact with a platen, and in the bulk removal step, contacting the substrate surface with the polishing pad and the bulk slurry, with motion therebetween, to remove material from the substrate surface and provide a bulk-processed surface of the substrate.

In another aspect the invention relates to a chemical-mechanical processing slurry useful for processing a nickel surface. The slurry includes: liquid carrier; abrasive particles dispersed in the liquid carrier, the abrasive particles comprising, as primary abrasive particles, silica abrasive particles having an average particle size of not greater than 100 nanometers; and optional oxidizing agent. The slurry may be a slurry concentrate or a point of use slurry and as a point of use slurry the slurry has a pH below about 3.

DETAILED DESCRIPTION

The following describes new and inventive CMP slurries that can be used for processing a surface of a nickel material, e.g., a nickel-phosphorus (e.g., electroless nickel phosphorus) layer of a CMP substrate (sometimes referred to as a "nickel layer"), by chemical mechanical processing. The slurries contain liquid carrier (e.g., water, organic solvent, or both), silica abrasive particles as primary abrasive particles, oxidizer (at the point of use and, optionally, previous to that), and may contain one or more other optional ingredients useful in a CMP slurry for processing a nickel layer.

Methods as described are for chemical-mechanical processing of a surface of a nickel layer by contacting the surface with slurry as described herein and a pad, with pressure and motion between the pad and the surface, to chemically and mechanically remove material from the nickel layer surface. The described inventive methods and slurries can be useful for CMP processing of a nickel surface at any stage of preparation of the nickel surface, including treating a surface in the form in which the surface was deposited onto a substrate by way of a preceding deposition step (i.e., in a CMP bulk removal step), or in any one or more of a series of CMP steps such as during one or more of a bulk removal step, a subsequent polishing step, or both.

According to the invention, Applicant has discovered that certain sizes and shapes of silica abrasive particles are effective as primary abrasive particles in a bulk removal step, in a polishing step, or in both, to provide effective or advantageous removal of nickel material from a nickel substrate surface. Silica abrasive particles that have a suitably low average particle size, and suitable morphology, have been found to be highly useful and advantageous in CMP processing steps for removing material from a nickel surface, including in a bulk removal step of processing a nickel substrate. Applicant's findings include that certain types of silica abrasive particles, meaning those that have suitably low average particle size and a suitable morphology (e.g., shape), as described, are useful as primary particles of a slurry in a bulk removal step for processing a nickel substrate surface, without the need for harder or larger-sized particles, and even in the absence or substantial absence of larger-sized abrasive particles, harder abrasive particles, or both, and furthermore, that particles having the described size and morphology can provide an effective and desired removal rate of material during a bulk removal step, with good surface properties.

Advantageously, the same types of particles that are useful in the bulk removal step can also be useful in a polishing step, allowing for efficiencies, such as when performing these two steps in series on a single substrate. Consequently, example methods of the invention are capable of processing a nickel substrate by a bulk removal step followed by a polishing step using a bulk slurry and a polishing slurry that contain the same primary abrasive particles and optional secondary particles, or that contain similar primary abrasive particles and optional secondary abrasive particles, those primary abrasive particles and optional secondary abrasive particles being described herein in terms of their size and morphology. In these or other embodiments, example methods may include processing a nickel substrate by a bulk removal step followed by a polishing step, using the same (single) platen to perform both of the bulk removal step and the polishing step. Alternately or additionally, the method can perform both of the bulk removal step and the polishing step using a single carrier to hold the substrate during both of the bulk removal step and the polishing step; the polishing step can be performed following the bulk removal step without removing the substrate from a carrier that was used to hold the substrate during the bulk removal step. Also, alternately or additionally, the bulk removal step may be performed without the need for a cleaning step to be performed to clean the substrate after the bulk removal step and before the polishing step, therefore, advantageously eliminating the need for removing the substrate from the carrier and handling the substrate external to the carrier between these two steps.

The primary and optional secondary particles can be silica abrasive particles, which can be composed of any type of silica that is presently known or that is developed in the future, and that can be prepared to exhibit useful size and morphology as described herein. The particles can be prepared by any of various methods that are known to be useful for forming silica particles to a desired size and morphology, those methods including forming particles and optional sorting or classifying of particles to isolate those having a particular feature, such as average particle size.

Examples of known silica materials that may be useful include fumed silica, fused silica, and colloidal (wet process) silica. Example silica particles include precipitated or condensation-polymerized silica, which may be prepared using known methods, such as by methods referred to as the "sol gel" method or by silicate ion-exchange. Condensation-polymerized silica particles are often prepared by condensing $Si(OH)_4$ to form substantially spherical particles. The precursor $Si(OH)_4$ may be obtained, for example, by hydrolysis of high purity alkoxysilanes, or by acidification of aqueous silicate solutions. U.S. Pat. No. 5,230,833, the entirety of which is incorporated herein by reference, describes a method for preparing colloidal silica particles in solution.

In terms of example sizes, primary particles and optional secondary particles that are useful as described may independently have an average particle size of not greater than 100 nanometers, e.g., less than 90, 80, 70, or 60 nanometers, depending on shape. Average particle size of the particles of a slurry can be measured using a dynamic light scattering (DLS) tool such as the Zetasizer® available from Malvern Instruments® (Worcestershire, UK).

Preferred shapes for the primary particles and, independently, the optional secondary particles, include "spherical" particles and "irregular" particles, either of which may be a shape of a primary particle of a slurry, and either of which may optionally be a shape of a secondary particle relative to the other shape being of a primary particle of the slurry. The term "spherical particles" as used herein refers to particles that are considered to be essentially entirely round at their surfaces, and spherical (meaning, in three-dimensions, having every point on a surface being essentially equidistant from a center), i.e., a spheroid. The particles can be highly spherical (meaning particles exhibit only slight deviation from a sphere), but, more typically, a collection of particles will also include particles that are slightly (or more-than-slightly) non-spherical but can still be considered to be substantially spherical in shape; such particles may be not perfectly spherical but may still exhibit cross-sectional symmetry in three (orthogonal) dimensions, e.g., may be oblate or prolate; such particles may furthermore have a maximum aspect ratio of two dimensions of a cross section of the particles that is in a range from 80:120 to 120:80, e.g., in a range from 90:100 to 100:90, or from 95:105 to 105:95.

The term "irregular-shaped particles" refers to particles that are non-spherical. Examples of irregular-shaped particles include particles that are round but not "spherical" as that term is used herein. "Round" or "rounded particles" are particles that are substantially round over their entire surfaces, lacking a high amount of jagged, cornered, pointed, or angled edges; these include elliptical, oblong, or otherwise rounded (e.g., irregularly, e.g., non-symmetrically-rounded) particles that are considered to be substantially round or curved in their cross-sectional shapes in three (orthogonal) dimensions, but are not spherical as that term is used herein. Preferred irregular-shaped particles do not contain a substantial amount of sharp or jagged corners, edges, or points, or flat surfaces having cornered, jagged, or fractured features at the surfaces or at edges of the surfaces, and include particles that are considered in the CMP processing or abrasive particles arts to be oblong, ellipsoid, ovoid, or even "cocoon-shaped" or "potato-shaped" particles.

Examples of rounded, irregular, and spherical silica particles are commercially available from companies that include Akzo Nobel (Amsterdam, Netherlands), Nissan Chemicals (Houston, Tex.), Fuso, Nalco, and others. Non-limiting examples of colloidal silica particles that are considered to be spherical or irregular in shape include the following commercial particle products (shape, average particle size): Bindzil 257/360 (irregular, 20 nm) (Akzo Nobel), Bindzil DP5110 (irregular, 30 nm) (Akzo Nobel), Bindzil 40/130 (spherical, 30 nm) (Akzo Nobel), Fuso PL-1 (irregular, 35 nm) (Fuso), Nalco 13573 (spherical, 45 nm) (Nalco), Fuso PL-3 (irregular, 65 nm), Fuso PL-3D (irregular, 60 nm), Bindzil 40/170 (spherical, 55 nm), Bindzil SP599 (irregular, 70 nm), Nalco 2360 (spherical, 75 nm), Bindzil 50/80 (spherical, 90 nm), and Nalco 2329K (spherical, 100 nm).

As used herein, the term "primary particles" (also, "primary abrasive particles") refers to particles that are in a slurry in a major amount, meaning at a level of at least 50 percent by weight base on a total weight of all abrasive particles in the slurry, or in an amount by weight that is greater than an amount of all other types of abrasive particles in the slurry. Preferred slurries may contain primary abrasive particles as described herein in an amount of at least 50, 60, 70, 80, 90, 95, 99, 99.5, 99.9, or up to 100 weight percent based on the total weight of all abrasive particles in the slurry. In certain embodiments, a slurry may contain the primary abrasive particles and no amount or substantially no amount of any other type of abrasive particles, e.g., less than 0.5, 0.1, or 0.05 weight percent of abrasive particles that are not part of the primary abrasive particles.

As used herein, the term "secondary particles" (also, "secondary abrasive particles") refers to abrasive particles that are in a slurry in a minor amount, meaning at a level that does not exceed 50 percent by weight based on the total weigh of abrasive particles in the slurry. A slurry may contain secondary abrasive particles in an amount that does not exceed 50, 40, 30, 20, 10, 5, 1, 0.5, or 0.1 weight percent, based on the total weight of all abrasive particles in the slurry. According to certain embodiments, a slurry may contain the primary particles and an optional amount of the secondary particles, with not more than an insubstantial amount of any other type of abrasive particles in the slurry. Examples of such slurries may contain at least 95, 99, 99.5, 99.9 or up to essentially 100 weight percent of the combined primary abrasive particles and optional secondary abrasive particles, based on total weight of all abrasive particles in the slurry. For example the slurry may contain no amount or substantially no amount of any other type of particles, e.g., less than 1, 0.5, 0.1, or 0.05 weight percent of particles that are not part of the primary particles or the secondary particles.

The primary abrasive particles that are useful according to the present description have desired size and morphology (e.g., shape) properties as described, and may be silica, e.g., colloidal silica. Abrasive particles of the slurry can optionally include a minor or small amount of non-silica particles such as alumina particles, but preferred slurries can include not more than an insubstantial amount of non-silica particles, and can preferably exclude non-silica particles that are alumina particles. Accordingly, preferred slurries can include not more than 0.5, 0.1, or 0.05 weight percent non-silica abrasive particles, e.g., not more than 2, 1, 0.5, 0.1, or 0.05 weight percent alumina abrasive particles.

The slurry can include any suitable amount of abrasive particles, including the primary abrasive particles and optional secondary abrasive particles. Example slurries may include at least about 1 weight percent abrasive particles based on total weight slurry, e.g., at least about 2 weight percent abrasive particles, based on total weight slurry, at the point of use. Example slurries may include up to about 12 weight percent, or up to about 10 weight percent, or up to about 7 or 8 weight percent abrasive particles based on total weight slurry, at the point of use.

Liquid carrier of the slurry facilitates application of the abrasive particles and chemical ingredients of the slurry to a surface of a substrate being processed. The liquid carrier may be any suitable carrier (e.g., solvent) such as a lower alcohol (e.g., methanol, ethanol, etc.), ether (e.g., dioxane, tetrahydrofuran, etc.), water, or a mixture thereof. Preferably, the liquid carrier comprises, consists essentially of, or consists of water, more preferably deionized water. A carrier that consists essentially of water can contain up to (not more than) 3, 2, 1, 0.5, 0.1, or 0.05 weight percent non-water solvent such as a lower alcohol (e.g., methanol, ethanol, etc.), ethers (e.g., dioxane, tetrahydrofuran, etc.).

The slurry is acidic during use in a CMP process, having a pH of not greater than about 3, e.g., not greater than about 2. A low pH of a slurry may be achieved or maintained by any suitable means. The slurry may include substantially any suitable pH adjusting agents or buffering systems. For example, suitable pH adjusting agents include organic and inorganic acids such as nitric acid, sulfuric acid, phosphoric acid, phthalic acid, citric acid, adipic acid, oxalic acid, malonic acid, maleic acid, etc.

The slurry may optionally and preferably include oxidizing agent, which may be added to the slurry during the slurry manufacturing process or just prior to a CMP operation (e.g., in a tank located at a point of use, such as at a semiconductor fabrication facility). Exemplary oxidizing agents include inorganic and organic per-compounds. A per-compound as defined by Hawley's Condensed Chemical Dictionary is a compound that contains at least one peroxy group (—O—O—), or a compound that contains an element in its highest oxidation state. Examples of compounds that contain at least one peroxy group include hydrogen peroxide and its adducts such as urea hydrogen peroxide and percarbonates, organic peroxides such as benzoyl peroxide, peracetic acid, and di-t-butyl peroxide, monopersulfates ($SO_5^-$), dipersulfates ($S_2O_8^=$), and sodium peroxide. Examples of compounds that contain an element in its highest oxidation state include periodic acid, periodate salts, perbromic acid, perbromate salts, perchloric acid, perchlorate salts, perboric acid, and perborate salts and permanganates. An often-preferred oxidizing agent is hydrogen peroxide.

Oxidizing agent may be included in a slurry in any useful amount, including an amount useful to provide a desired removal rate of nickel material from a surface of a nickel layer. Exemplary amounts at a point of use can be in a range from about 0.1 to about 10 weight percent based on total weight slurry, such as from about 0.1 to about 6 weight percent (e.g., from about 0.2 to about 5 weight percent, from about 0.3 to about 4 weight percent, or from about 0.5 to about 3 weight percent based on total weight slurry).

A metal ion catalyst optionally included in the slurry is a compound that contains a metal ion that is capable of reversible oxidation and reduction in the presence of nickel-phosphorus and an oxidizing agent (e.g., hydrogen peroxide). Any suitable metal ion catalyst may be used.

Preferred metal ions include ions of iron, cobalt, copper, europium, manganese, rhenium, molybdenum, iridium and tungsten. Non-limiting examples of such metal ions include $Fe^{2+}$, $Fe^{3+}$, $Co^{2+}$, $Cu^{2+}$, $Eu^{3+}$, $Mn^{2+}$, $W^{6+}$, $Mo^{5+}$ and $Ir^{3+}$. Preferably, the metal ion is or comprises $Fe^{3+}$. Typically, the metal ion is included in the CMP composition as a soluble salt, for example, a nitrate, a halide (e.g., chloride), a sulfate, or the like.

The metal ion catalyst may be present in the slurry (at point of use) at a concentration of greater than about 1 ppm (e.g., about 5 ppm, about 10 ppm, about 20 ppm, about 50 ppm, about 100 ppm). The metal ion catalyst is, preferably, present in the composition (at point of use) at a concentration of less than about 1000 ppm (e.g., about 750 ppm, about 500 ppm, about 250 ppm, about 150 ppm, about 125 ppm). The metal ion catalyst may be present in the composition (at point of use) at a concentration range bounded by any of the aforementioned concentrations, for example, about 1 to about 1000 ppm, preferably about 20 to about 250 ppm, e.g., about 50 to about 150 ppm.

The slurry may optionally contain a catalyst stabilizing agent, which can function chemically with materials of the slurry and the substrate to improve a rate of removal of material from a substrate, e.g., by chelating (to a stabilizing degree) a metal ion of a metal ion catalyst. Example catalyst stabilizing agents include organic compounds that include two or three carboxylic acid substituents, and that are capable of chelating with a metal ion of a metal ion catalyst also present in the slurry. Non-limiting examples include oxalic acid, malonic acid, succinic acid, malic acid, tartaric acid, citric acid, glutaric acid, adipic acid, maleic acid, phthalic acid and iminodiacetic acid. See United States Patent Publication 2015/0152289, the entirety of which is incorporated herein by reference. The term "carboxylic acid" refers to the free acid form as well as a salt of a carboxylic acid (e.g., alkali metal salts).

Catalyst stabilizing agent can be present at a concentration of about 0.001 to about 2 weight percent, based on total weight slurry (at a point of use), e.g., from about 0.03 to about 0.4 weight percent, or from about 0.04 to about 0.2 weight percent based on total weight slurry at a point of use. Alternately stated, catalyst stabilizing agent can be present at a molar concentration that is at least twice the molar concentration of the metal ion (e.g., 2 to 20 times the metal ion molar concentration, preferably about 2 to 10, or 2 to 5 times the metal ion molar concentration).

The slurry may optionally contain a nickel complexing agent, which can function chemically with materials of the slurry and the substrate to improve removal rate, e.g., by stabilizing nickel ions in the slurry after removal of the ions from a substrate surface. Without wishing to be bound by theory, it is believed that a nickel complexing agent in the slurry can facilitate removal of the nickel by complexing with nickel ions in the slurry that are formed during the removal process. Useful nickel-complexing agents include amino acids and carboxylic acids, including glycine, alanine, aspartic acid, histidine, nitriloacetic acid, iminodiacetic acid, acetic acid, tartaric acid, citric acid, oxalic acid, lactic acid, glutaric acid, maleic acid, gluconic acid, malonic acid and glycolic acid. Nickel-complexing agent may be included in a slurry in any useful amount, for example in an amount of about 0.3 to about 6 weight percent, for example from about 0.3 to about 1 weight percent, based on total weight slurry, at a point of use.

A slurry as described may be prepared by known methods, such as by combining ingredients or components as described, with mixing, to provide a liquid slurry of the abrasive particles uniformly suspended in liquid carrier, the liquid carrier preferably being in the form of a uniform solution. Useful methods of preparation include batch, semi-batch, and continuous process. Generally, the slurry may be prepared by combining the components thereof in any order with sufficient mixing to provide uniformity.

Oxidizing agent, may, if desired, be added at any time during the preparation of the slurry. For example, the slurry, containing oxidizing agent, may be prepared and sold and delivered for commercial use with oxidizing agent present in the slurry. Alternately, the slurry may be prepared, sold, and delivered, as a slurry that does not contain oxidizing agent. The slurry without oxidizing agent may be transported, stored, and delivered before commercial use without the oxidizing agent being added. Shortly before using the slurry in a CMP process, e.g., at or just prior to a point of use, oxidizing agent may be added, for example within about 1 minute, or within about 10 minutes, or within about 1 hour, or within about 1 day, or within about 1 week of the CMP operation. The slurry may also be prepared by mixing the components at the surface of the substrate (e.g., on the polishing pad) during the CMP operation.

Many commercial slurry products are provided in the form of an abrasive particle slurry concentrate that is intended to be diluted with an appropriate amount of water to form a "use composition" or "point of use slurry" before use in CMP processing, e.g., by an end user of the slurry, optionally at or near a point of use. In these embodiments, the abrasive particle slurry concentrate may include the abrasive particles in a liquid medium (liquid carrier), either alone or in combination with one or more other components of the slurry that are desired at a point of use.

In certain embodiments of slurry products for processing a hard disk (e.g., containing a nickel surface), a first concentrate that contains the abrasive particles (i.e., an abrasive particle slurry concentrate) may be provided in a first package, with some or all of the other components of a point of use slurry being provided separately. Some or all of the non-abrasive particle components may be provided separately, e.g., in a second composition such as a "chemistry concentrate" that may be in a separate (second) package and may also optionally be in a concentrated form. The second concentrate in the second package (e.g., a "chemistry pack") may include acid, metal ion catalyst, stabilizer, etc., in relative amounts that can be combined with the abrasive particle slurry concentrate and water to produce a point of use slurry. Optionally, oxidizer (e.g., hydrogen peroxide) can also be included in a first or a second concentrate, but oxidizer may also be added as a separate component to the point of use slurry, at the point of use. Advantageously, the abrasive particles in a first package, separated from one or more of the other components of a point of use slurry, can exhibit desired stability and shelf life that may be diminished if the abrasive particles were included at a high concentration in a concentrate, especially when combined with acid such that the concentrate is at a low pH.

The amounts of abrasive particles and other optional components in a concentrate can be amounts that, upon dilution of the concentrate with an appropriate amount of water, each component of the slurry may be present in the slurry at the point of use, in an amount within a range recited herein for that component in a point of use slurry.

For example, abrasive particles (optionally also other components of a point of use slurry) may be present in a concentrate in an amount that is about 2 times (e.g., about 3 times, about 4 times, about 5 times, or even about 10 times) greater than a concentration of abrasive particles (or other component) specified herein, so that when the concentrate is diluted with one equal volume of water (alternately 2, 3, 4, or even 9 equal volumes of water, respectively), the abrasive particles (or other component) will be present in the slurry (at a point of use) in an amount within the ranges set forth herein. The concentrate can also contain an amount of water that will ensure that other components are at least partially or fully dissolved in the concentrate.

In one embodiment of an abrasive particle slurry concentrate, the concentrate can include at least 5, 10, 20, or even up to 25, 30, 40, or about 50 weight percent abrasive particles as described herein, dispersed in a water-based liquid carrier. Optionally, this concentrate can include low amounts or none of any of the other components of a point of use slurry, such as, independently, less than 2, 1, 0.5, or 0.1 weight percent of metal ion catalyst, stabilizing agent, or oxidizer, based on total weight concentrate. Not containing acid, the pH of this concentrate can be above 3 or above 4, e.g., from 6 to 11.

In one embodiment of a second concentrate, such as a chemistry concentrate that need not contain abrasive particles, the concentrate can include one or a combination of acid, metal ion catalyst, stabilizer, etc., in relative amounts that can be combined with the abrasive particle slurry concentrate and water to produce a point of use slurry. Optionally, this concentrate can include low amounts or none of any of the other components of a point of use slurry, such as, independently, less than 2, 1, 0.5, or 0.1 weight percent abrasive particles or oxidizer, based on total weight concentrate.

According to methods of using a concentrate, the concentrate can be combined with water and a second concentrate (e.g., a chemistry concentrate) at a point of use. Upon combining the concentrate or concentrates with water (e.g., DI water) and oxidizer (e.g., hydrogen peroxide) at the point of use, the point of use slurry will contain amounts of ingredients such as from 1-10 weight percent abrasive particles based on total weight slurry, and have a pH in a range from 1-3.

A slurry as described may be useful for chemical mechanical processing (bulk material removal, planarizing, polishing, etc.) of a substrate, especially a substrate that contains nickel at a surface. Example slurries can be useful in processing a non-magnetic nickel layer of a hard disk product or precursor, such as a hard magnetic disk component useful in a computer disk drive. Hard magnetic disks typically include a non-magnetic substrate base made of a flat and rigid non-magnetic material such as aluminum, glass, glass-ceramic, or another similar material. Different functional layers are applied to the base, one of which is a magnetic storage layer. Another common layer is a non-magnetic nickel layer, e.g., NiP, e.g., "electroless" nickel, which is present to provide hardness or strength to the multi-layer disk structure. The types and compositions of layers of the structure may vary, with examples including one or more "underlayers" sputtered onto the plated Ni; one or more magnetic (e.g., cobalt alloy) layers sputtered onto an underlayer; a carbon protective overcoat sputtered onto a magnetic layer; and one or more lubricant layer deposited on the carbon.

The nickel layer, which is non-magnetic and amorphous, provides a strong and hard base for added magnetic and other layers. See, e.g., U.S. Pat. Nos. 6,977,030, and 6,159,076, describing hard magnetic disks used in computer disk drives (the entireties of these patent documents being incorporated herein by reference). Example nickel layers can be made of nickel phosphorus (NiP), e.g., "electroless nickel" or "electroless NiP," as those terms are known and understood in the hard disk manufacturing arts to include layers that consist of or consist essentially of nickel and phosphorus and are commonly applied to a rigid hard disk substrate by an electroless method. By some methods, the nickel layer is applied by electroless nickel plating methods, which are known, followed by an optional annealing step at high temperature.

The nickel layer as applied typically contains only nickel and phosphorus, e.g., at least 95, 99, or 99.5 weight percent nickel and phosphorus based on total weight of the layer. The amount of phosphorus relative to the amount of nickel can be as low as about 1 percent (atomic) phosphorus and as high as about 20 percent (atomic) phosphorus based on the total amount (atomic) of nickel and phosphorus. For hard memory disk applications, the amount of phosphorus is typically at least 10 percent (atomic), e.g., from about 10 to about 12 or 14 percent (atomic) phosphorus based on the total amount (atomic) of nickel and phosphorus in the nickel layer. See, e.g., U.S. Pat. No. 6,977,030, describing features of electroless nickel layers.

After placing the nickel layer onto the substrate, added layers are placed over the nickel layer. But before placing those added layers, the nickel layer surface must first be processed to a smooth and uniform surface that contains a low level of defects (e.g., scratches or embedded abrasive particles). A highly uniform, smooth, and low roughness surface of the nickel layer is required for reliable performance of the hard disk.

According to the present description, processing a nickel layer surface to provide a smooth and uniform surface having a low level of defects and desired surface properties can be performed by chemical-mechanical processing using a slurry as described, that includes primary abrasive particles as described, optional secondary abrasive particles as described, each of those types of particles including abrasive particles having size and morphology as described, and that are preferably silica.

A useful CMP process can involve a CMP apparatus having a platen, which, in use, is in motion and has a velocity that results from orbital, linear, or circular motion. A polishing pad contacts the platen and moves with the platen. A carrier holds a substrate to be polished by contacting and moving a surface of the substrate relative to a surface of the polishing pad. Abrasive slurry is dispensed onto the surface of the substrate, the pad, or both. Processing of the substrate surface takes place by the substrate being placed in contact with the polishing pad and the abrasive slurry, while the polishing pad moves relative to the substrate surface to abrade at least a portion of the substrate surface. The carrier of the CMP apparatus provides controllable pressure on the substrate, pressing the substrate against the polishing pad. Relative motion of the substrate and pad abrades or facilitates chemical removal of material from the surface of the substrate. Removal of the material from the substrate surface may be based on the combined effects of the chemical activity of the slurry (e.g., by catalyst, oxidizing agent, etc., present in the slurry) and the mechanical activity of the pad and the abrasive particles suspended in the slurry.

A CMP process may be performed using any suitable polishing pad (e.g., polishing surface). Suitable polishing pads include, for example, woven pads, non-woven polishing pads, polymeric (e.g., foam) polishing pads, and the like, many examples of which are known and commercially available. Pads suitable for processing a nickel-phosphorus surface can be constructed of suitable polymers of desired density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

According to embodiments of CMP processes using a slurry as described, including primary abrasive particles and optional secondary particles as described, a nickel layer can be processed by CMP processing in a manner that produces a useful removal rate of the nickel material (e.g., NiP, electroless nickel), useful surface properties of the finished substrate, and preferably both. A slurry as described may be useful in a bulk removal step, in a polishing step, or both.

As a starting material for CMP processing, the nickel layer can be a layer of nickel material (e.g., NiP, electroless NiP) deposited onto a base substrate, optionally following a step of annealing the deposited nickel layer (for stress relief, at elevated temperature of at least about 200 degrees Celsius), but prior to any step of processing the surface to remove, planarize, or polish the nickel layer surface (i.e., the "deposited" nickel layer surface). This deposited nickel layer surface will have surface properties that must be improved before a subsequent layer of material can be placed over its surface. For example, prior to processing by chemical mechanical processing, a deposited nickel layer surface may have a micro-waviness of at least about 30 angstroms, measured by incidence interferometry, such as by using a Zygo NewView 100 wafer inspection device from Zygo Corp. (Middlefield, Conn.), at 80-500 µm wavelength. Microwaviness is linearly correlated with surface roughness, which can be determined using optical or physical techniques.

According to methods of CMP processing of a surface of a deposited nickel layer, useful methods may typically include multiple substantially discrete CMP processing steps, each step optionally using a different slurry and different processing conditions (rotational speeds, pressure, timing of contact, etc.), to prepare the nickel surface for processing by adding another layer of material onto the nickel layer. According to many conventional methods of this type, a first step is typically a bulk removal step that involves a relatively aggressive mode of removing material from the substrate surface at a high removal rate, and a second step that is typically a less aggressive polishing step. According to the invention, highly advantageous processing efficiencies can be achieved by use of a slurry that contains primary and optional secondary abrasive particles as described herein, in the bulk removal step, the polishing step, or both.

A method of the present invention can include a bulk removal step that is adapted to effect a useful removal rate of the NiP material from a deposited nickel surface of a substrate, using a slurry as described, having primary abrasive particles and optional secondary abrasive particles as described herein. Prior to processing by the bulk removal step, the nickel layer surface of the substrate may have a micro-waviness of at least about 30 angstroms, measured by incidence interferometry. Desirably, the micro-waviness of the nickel layer surface may be reduced to a value of from about 2 to about 5 angstroms after the bulk removal step.

A slurry as described herein can be useful as a bulk slurry in this bulk removal step for removing material from a deposited NiP surface. The slurry can be one as described, including a high amount of the primary abrasive particles, an optional amount of secondary abrasive particles, and preferably a low amount or effective absence of non-silica particles, such as a low amount or effective absence of alumina particles. According to example bulk slurries, the primary abrasive particles and the optional secondary abrasive particles can each be colloidal silica particles having an average particle size of below 100 nanometers and having a spherical or irregular shape. According to certain embodiments, the primary abrasive particles can be spherical colloidal silica particles having an average particle size of not greater than 100 nanometers, e.g., not greater than 90, 80, 70, or 60 nanometers; the slurry may also (optionally) include secondary abrasive particles that are colloidal silica particles of irregular shape and that have an average particle size of not greater than 60 nanometers, e.g., not greater than 55, 50, 45, or 40 nanometers. In alternate embodiments, the primary abrasive particles can be irregular (e.g., rounded), having an average particle size of not greater than 60 nanometers, e.g., not greater than 55, 50, 45, or 40 nanometers; the slurry may also include secondary abrasive particles that are spherical colloidal silica particles having an average particle size of not greater than 100 nanometers, e.g., not greater than 90, 80, 70, or 60 nanometers.

Following the bulk removal step, one or more subsequent, different, CMP processing steps can be performed to provide a fine (polished) finish of the nickel surface. A subsequent step, e.g., a "polishing" step, may be performed at a lower removal rate relative to the bulk removal step. An inventive slurry as described herein, containing primary abrasive particles and optional secondary abrasive particles as described, can also be useful in any such subsequent step. The abrasive particles (primary abrasive particles, optional secondary abrasive particles, etc., as applicable) in the polishing slurry may be the same as (identical to) the abrasive particles of the bulk removal slurry, but it is not necessary or required that the abrasive particles be identical. According to certain embodiments, the same (identical in composition) slurry that is used in the bulk removal step may also be used in the polishing step, but this is also not necessary or required. In other embodiments, the slurry of the polishing step may be different in terms of its abrasive particles (sizes, morphology, composition), chemistry, or both. But, while the abrasive particles of the polishing slurry may be different from the abrasive particles of the bulk slurry, the abrasive particles of the polishing slurry may preferably be as described herein, including primary abrasive particles and optional secondary abrasive particle that exhibit size and morphology as described.

Relative to the bulk removal step, a polishing step may be performed using a relatively softer CMP pad that may include a smaller pore size compared to a pad used in the bulk removal step. The pressure (of the substrate held to the pad) used during the polishing step may be slightly lower compared to the pressure used in the bulk removal step. Desirably, the micro-waviness of the nickel layer surface may be reduced to a value of less than about 5, 2, or less than about 1.2 angstroms after one or more subsequent (fine, or polishing) CMP steps.

The slurry of the polishing step (the polishing slurry) may be identical to the bulk slurry, or may be different, while still containing primary abrasive particles and optional secondary abrasive particles as described herein. The polishing slurry can be a slurry as described herein, including a high amount of the primary particles, an optional amount of secondary particles, and preferably a low amount or effective absence of non-silica particles, such as a low amount or effective absence of alumina particles. According to example polishing slurries, the primary abrasive particles and the optional secondary abrasive particles can each be colloidal silica particles having an average particle size of below 100 nanometers and having a spherical or irregular shape. According to certain embodiments, the primary abrasive particles of the polishing slurry can be spherical colloidal silica particles having an average particle size of not greater than 100 nanometers, e.g., not greater than 90, 80, 70, or 60 nanometers; the polishing slurry may also (optionally) include secondary particles that are colloidal silica particles of irregular shape and that have an average particle size of not greater than 60 nanometers, e.g., not greater than 55, 50, 45, or 40 nanometers. In alternate embodiments, the primary abrasive particles can be irregular (e.g., rounded), having an average particle size of not greater than 60 nanometers, e.g., not greater than 55, 50, 45, or 40 nanometers; the slurry may also include secondary abrasive particles that are spherical colloidal silica particles having an average particle size of not greater than 100 nanometers, e.g., not greater than 90, 80, 70, or 60 nanometers.

Thus, in carrying out the invention, example method steps may involve one or more abrasive CMP slurries that contain silica abrasive particles as primary abrasive particles, and optionally also as secondary abrasive particles, as those particles are described herein based on composition, size, and morphology. The abrasive particles can have an average size that is relatively small but that may be within a range of such relatively small sizes, e.g., an average particle size of below 100 nanometers. Preferred primary abrasive particles and secondary abrasive particles can be spherical or irregular (e.g., rounded) in shape. In preferred methods, the relatively small size and the shape or shapes of the abrasive particles, as well as the silica composition of the particles, allow for the same or similar particles to be used in both a bulk slurry for use in a bulk removal step, and a polishing slurry for use in a polishing step.

Using the same or similar types of the described relatively small-average-sized silica particles having desired morphologies (e.g., shapes) in both a bulk removal step and a polishing step can allow for advantageous efficiencies of one or more of: convenient use of the same (in terms of composition) or similar slurry in a bulk removal step and a polishing step, or the same or similar abrasive particles in the bulk removal step and the polishing step (if not the same slurries); a single-platen process, meaning a bulk removal step and a polishing step performed on the same (single) platen; elimination of a cleaning step between a bulk removal step and a polishing step; use of one carrier for both of the bulk removal step and the polishing step; or two or more of these advantages. Desirably, in particularly preferred methods, the slurries can be useful in a single-platen CMP method that has process features (e.g., removal rate) and finished substrate surface properties (e.g., roughness, microwaviness, flatness, low defects) that are suitable for commercial processes, with particularly preferred slurries and methods providing process and finished substrate features that are comparable to or at least competitive with conventional two-platen processes.

The efficiencies and advantages of using the described slurries, which contain the described primary and optional secondary abrasive particles, can result in reduced cost, reduced labor, and reduced handling of a substrate during CMP processing of a substrate surface. A longstanding desire for CMP processing has been to avoid a cleaning step, with its attendant handling requirements, between a bulk removal step and polishing step. Specifically, a series CMP processing steps that includes a bulk removal step and a polishing step, that can be performed on a substrate without removing the substrate from a carrier, would be highly desirable. A method of performing a bulk removal step in a carrier, and a polishing step in the same carrier, as described herein, eliminates the need for removing the substrate from the carrier and handling and transporting the substrate external to the carrier. Eliminating handling and transport of the substrate can reduce the risk of contamination or damage that may occur during these steps. Eliminating a cleaning step is advantageous by eliminating a complex and expensive step and allowing faster throughput.

EXAMPLE

Figure 1:
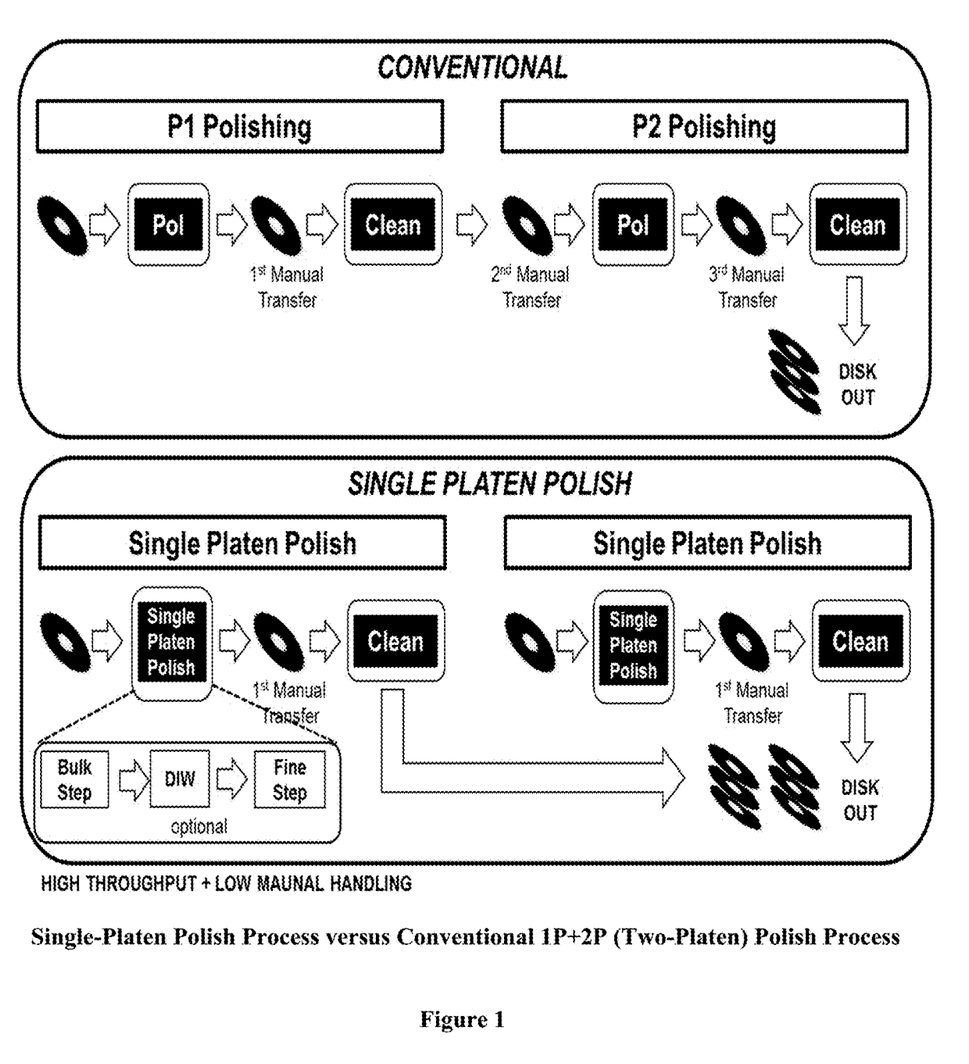
FIG. 1 is a schematic diagram of prior art CMP processes and a single-platen CMP process example of the invention.

Concept of Single-Platen Polish:

As shown in the schematic diagram in FIG. 1, single-platen process is accomplished with a bulk step and a fine step on one single piece of equipment, followed by a post-CMP cleaning process. Compared with conventional 1P+2P (two-platen) process, a single-platen polish process is able to reduce disk loading and unloading requirements from a carrier by fifty percent, eliminate a post 1P cleaning process (outside of the carrier), and thus reduce possible surface damage introduced by handling and transporting of disks between the bulk removal step and the polish step, improving industrial capacity and reducing labor intensity.

Experimental Procedures:

A single-platen process was carried out using an Hamai 9B Polisher and Fujibo FK1N polishing pad. Bulk slurry and fine (polishing) slurry were supplied through two pipelines of the polisher. A 0-30 seconds DI water rinse step was used in between each bulk step and fine step. Six disks were polished in each run using a slurry flow rate of 350 ml/min. The post polished disks were cleaned in Invenpro cleaner and then dried. Weight measurement was carried out on 3 disks to understand the removal rate (RR). Surface defect measurement was taken using Candela 7100. Both the top and the bottom of the disks were measured. Surface roughness measurement ($\mu$Wa-s) was taken using Zygo Newview 100 at 80~500 um wavelength. A conventional 1P+2P (two-platen) process was carried out as baseline using SpeedFam 16B Double Surface Polisher (1P) and Hamai 9B Polisher (2P).

Conventional 1P slurry consisted of (a) alpha alumina (variable), (b) fumed alumina (variable), (c) colloidal silica, (d) Ni complexing agent, (e) oxidation catalyst, (f) nitric acid (for pH adjustment), (g) hydrogen peroxide. Conventional 2P slurry consisted of (a) colloidal silica with average particle size of 10~40 nm, (b) hydrogen peroxide, (c) nitric acid (for pH adjustment), (d) Ni complexing agent (variable), (e) a first alcohol comprising one or more of monohydric alcohol, polyhydric alcohol, and diglycol, and a second alcohol consisting of polyvinyl alcohol (variable).

Slurry formulation for bulk step of single-platen polish consisted of: (a) colloidal silica (as listed in Table 1), (b) hydrogen peroxide, (c) nitric acid (for pH adjustment), (d) Ni complexing agent (variable), (e) a first alcohol comprising one or more of monohydric alcohol, polyhydric alcohol, and diglycol, and a second alcohol consisting of polyvinyl alcohol (variable). Slurry formulation for fine step of single-platen polish consisted of: (a) colloidal silica with average particle size of 10~40 nm, (b) hydrogen peroxide, (c) nitric acid (for pH adjustment), (d) Ni complexing agent (variable), (e) a first alcohol comprising one or more of monohydric alcohol, polyhydric alcohol, and diglycol, and a second alcohol consisting of polyvinyl alcohol (variable).

Note: (Variable) refers to varying type, concentration, and may or may not be in all slurry composition in the disclosure.

Results:

TABLE 1

Details of Abrasives for Bulk Step of Single-Platen Polish and Post-Polish Performance

| Abrasives for Bulk Step of Single-Platen Polish | Supplier | Average Particle Size (nm) | PDI = (width/mean)$^2$ | Morphology of Particle | Post Single-Platen Bulk + Fine Performance | |
|---|---|---|---|---|---|---|
| | | | | | Scratch | $\mu$Wa-s |
| Particle A | Supplier 1 | 20 | 0.1~0.2 | Irregular | ◯ | ◯ |
| Particle B | Supplier 1 | 30 | 0.1~0.2 | Irregular | ◯ | ◯ |
| Particle C | Supplier 1 | 30 | 0.0~0.1 | Spherical | ◯ | ◯ |
| Particle D | Supplier 2 | 35 | 0.1~0.2 | Irregular | ◯ | ◯ |

TABLE 1-continued

Details of Abrasives for Bulk Step of Single-Platen Polish and Post-Polish Performance

| Abrasives for Bulk Step of Single-Platen Polish | Supplier | Average Particle Size (nm) | PDI = (width/mean)$^2$ | Morphology of Particle | Post Single-Platen Bulk + Fine Performance | |
|---|---|---|---|---|---|---|
| | | | | | Scratch | μWa-s |
| Particle E | Supplier 3 | 45 | 0.0~0.1 | Spherical | ○ | ○ |
| Particle F | Supplier 2 | 65 | 0.0~0.1 | Irregular | ○ | ○ |
| Particle G | Supplier 2 | 60 | 0.0~0.1 | Irregular | ○ | ○ |
| Particle H | Supplier 1 | 55 | 0.1~0.2 | Spherical | ○ | ○ |
| Particle I | Supplier 1 | 70 | 0.0~0.1 | Irregular | X | ○ |
| Particle J | Supplier 3 | 75 | 0.0~0.1 | Spherical | ○ | ○ |
| Particle K | Supplier 1 | 90 | 0.1~0.2 | Spherical | ○ | ○ |
| Particle L | Supplier 3 | 100 | 0.0~0.1 | Spherical | X | ○ |
| Particle M | Supplier 3 | 110 | 0.0~0.1 | Spherical | X | ○ |
| Particle N | Supplier 1 | 110 | 0.1~0.2 | Irregular | X | ○ |

○ Match conventional 1P + 2P performance (Comparable or better)
X Did not match conventional 1P + 2P performance This invention has identified that various on the applicable species (size and morphology) of abrasive particles in a bulk step, may be useful in a bulk removal step of processing a nickel substrate, such as but not necessarily a first step of a single-platen process. "Applicable species" refers to those particles that, in a single-platen polishing performance (especially scratch), after bulk and fine steps, can exhibit performance that is comparable to performance of a conventional 1P+2P process.

As shown in Table 1, various abrasive particles with different average particle size, and morphology, from different suppliers, were tested as abrasives in a bulk slurry of a single-platen polish (Chemistry of these bulk slurries are same). The slurry of the fine step was fixed in all the tests. The results show that in terms of μWa-s, all particles regardless of size, distribution, and morphology are applicable. In terms of scratch performance, the applicable species of abrasive particles in bulk step of the single-platen process are determined by both particle size and morphology.

Figure 2:
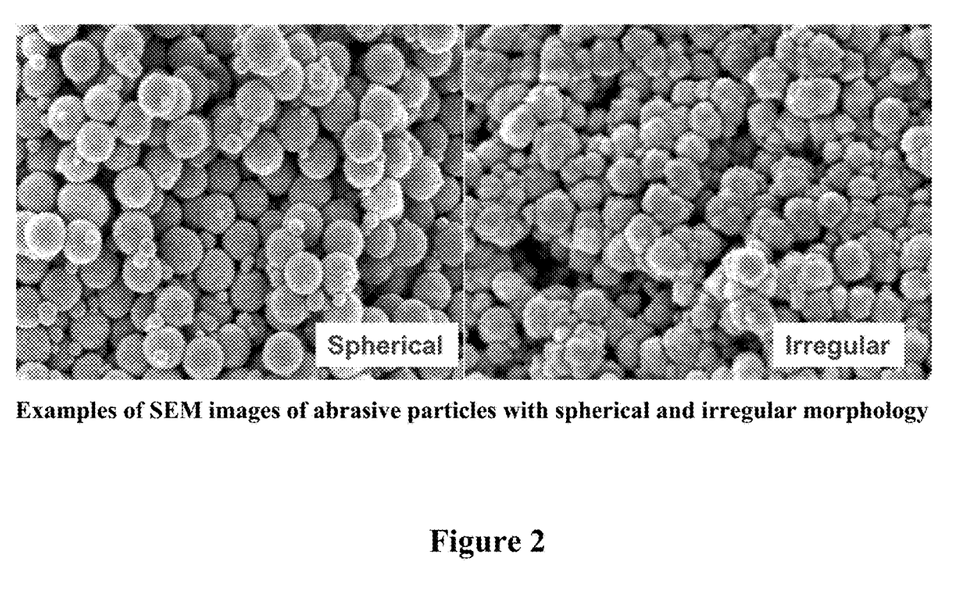
FIG. 2 includes photomicrographs of particles as described.

FIG. 2 shows examples of SEM images of abrasive particles with different morphology.

(1) Spherical abrasives with average particle size≤90 nm are applicable for single-platen process.

(2) Irregular abrasives with average particle size≤60 nm are applicable for single-platen process.

Conclusions:

It is disclosed the applicable abrasive particles for a bulk step of a single-platen polish, which enables performance of single-platen polish, are comparable to the performance of a conventional 1P+2P (two-platen) process.

(1) Spherical abrasives with average particle size≤90 nm are applicable for single-platen process.

(2) Irregular abrasives with average particle size≤60 nm are applicable for single-platen process.

The invention claimed is:

1. A method of chemical-mechanical processing a nickel-phosphorus surface by a bulk removal step, the method comprising:
providing a substrate having a nickel-phosphorus surface;
providing bulk slurry comprising bulk slurry abrasive particles dispersed in liquid carrier, the bulk slurry abrasive particles comprising, as hulk slurry primary abrasive particles, silica abrasive particles having an average particle size of not greater than 100 nanometers;
providing a polishing pad in contact with a platen,
in the bulk removal step, contacting the substrate surface with the polishing pad and the bulk slurry, with motion therebetween, to remove material from the substrate surface and provide a bulk-processed surface of the substrate,
providing polishing slurry comprising polishing slurry abrasive particles dispersed in liquid carrier, the polishing slurry abrasive particles comprising, as polishing slurry primary abrasive particles, the polishing slurry primary abrasive particles are irregularly-shaped and have an average particle size of not greater than 60 nanometers,
in a polishing step, contacting the bulk-processed surface with the polishing pad used in the bulk removal step and the polishing slurry, with motion therebetween, to remove nickel-phosphorus material from the surface to produce a polished surface, wherein, after the bulk removal step and before the polishing step, the method does not include a step of rinsing the substrate surface.

2. The method of claim 1 wherein the bulk slurry abrasive particles include at least 95 weight percent silica abrasive particles having an average particle size of not greater than 100 nanometers, based on total weigh abrasive particles in the bulk slurry.

3. The method of claim 1 wherein the bulk slurry abrasive particles consist essentially of the silica abrasive particles having an average particle size of not greater than 100 nanometers.

4. The method of claim 1 wherein the silica abrasive particles are colloidal silica particles.

5. The method of claim 1 wherein the hulk slurry primary abrasive particles are spherical particles having an average particle size of not greater than 90 nanometers.

6. The method of claim 1 wherein the bulk slurry abrasive particles comprise bulk sherry secondary abrasive particles that are irregular-shaped and have an average particle size of not greater than 60 nanometers.

7. The method of claim 1 wherein the bulk slurry primary abrasive particles are irregular-shaped and have an average particle size of not greater than 60 nanometers.

8. The method of claim 1 wherein a rate of removal of the nickel-phosphorus material from the surface during the polishing step is less than a rate of removal of the nickel-phosphorus material from the substrate during the bulk removal step.

* * * * *

UNITED STATES PATENT AND TRADEMARK OFFICE
CERTIFICATE OF CORRECTION

| | |
|---|---|
| PATENT NO. | : 10,968,377 B2 |
| APPLICATION NO. | : 15/951598 |
| DATED | : April 6, 2021 |
| INVENTOR(S) | : Li et al. |

Page 1 of 1

It is certified that error appears in the above-identified patent and that said Letters Patent is hereby corrected as shown below:

In the Claims

In Column 20, Claim 5, Line 52, delete "hulk" and insert --bulk--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*